UNITED STATES PATENT OFFICE.

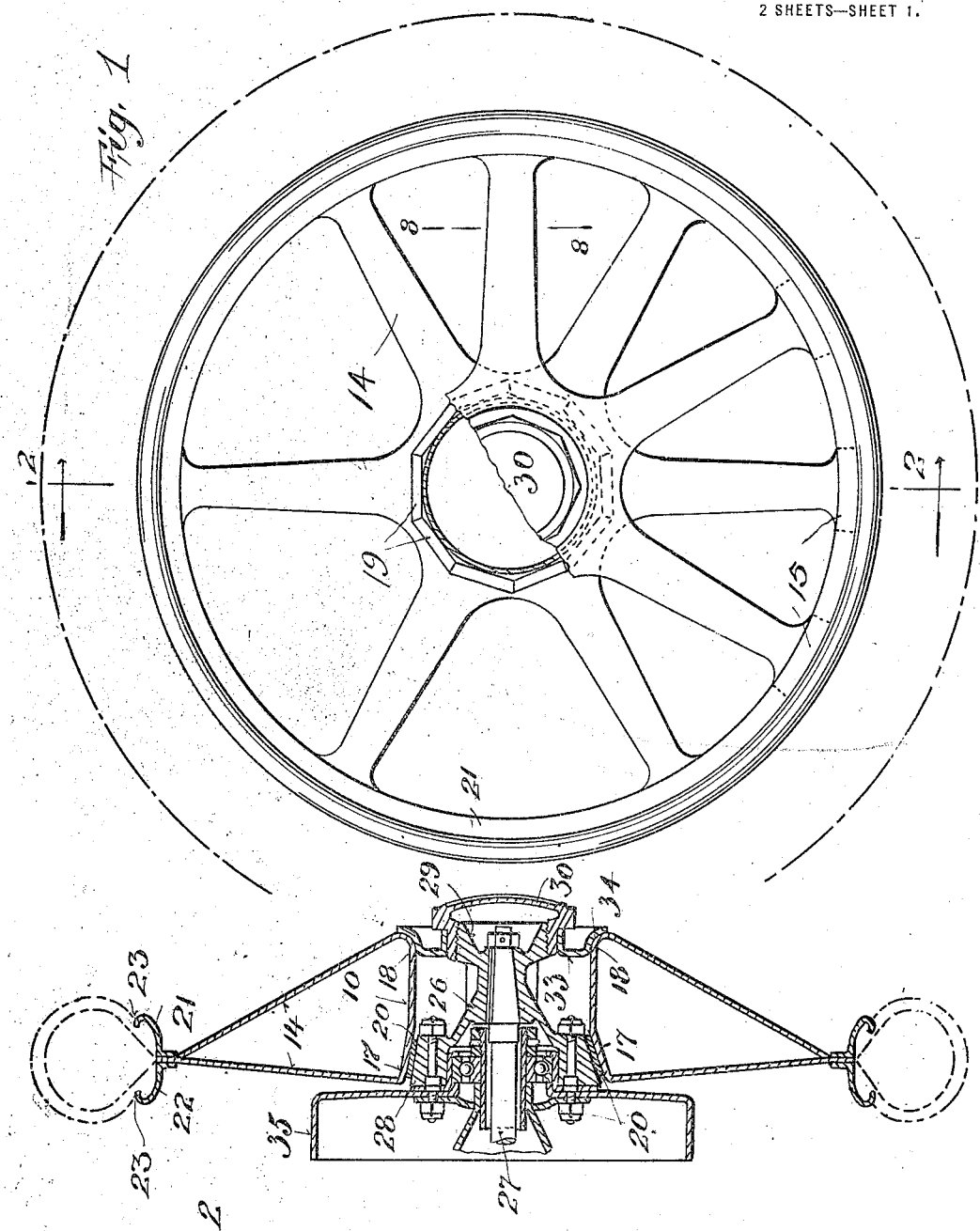

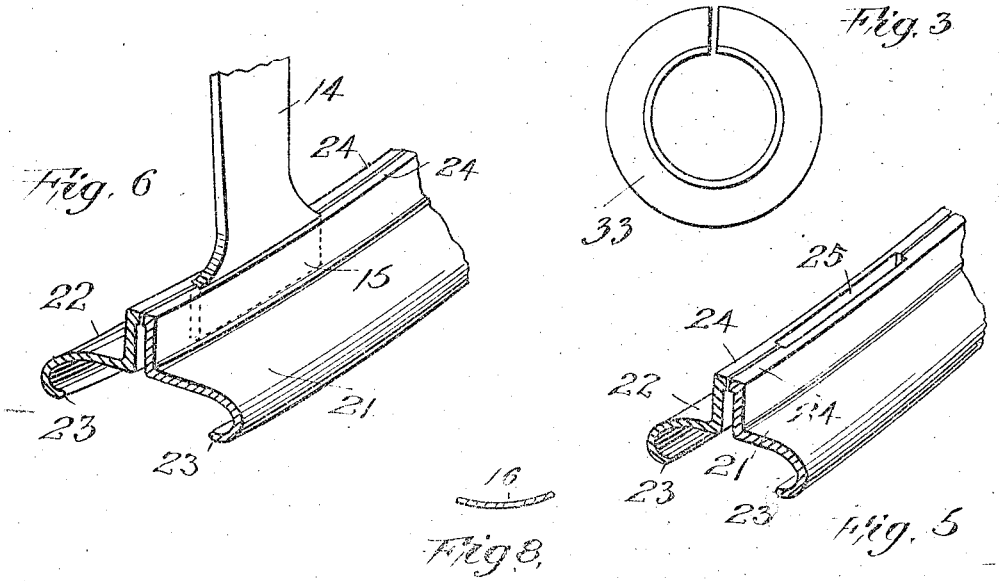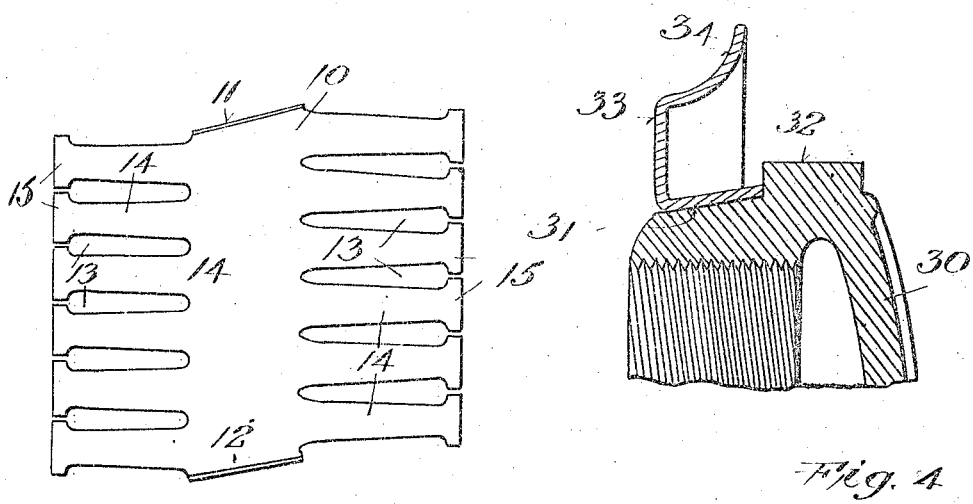

JOSEPH LEDWINKA, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

PRESSED-STEEL WHEEL.

1,423,229.

Specification of Letters Patent.     Patented July 18, 1922.

Application filed February 21, 1917. Serial No. 150,084.

*To all whom it may concern:*

Be it known that I, JOSEPH LEDWINKA, a citizen of the United States, residing at Philadelphia, in the county of Philadelphia, State of Pennsylvania, have made a certain new and useful Invention in Pressed-Steel Wheels, of which the following is a specification.

This invention relates to pressed steel wheels.

The object of the invention is to provide a pressed steel wheel of novel construction, which is economical to manufacture, strong, durable and efficient and a process for making the same.

Other objects of the invention will appear more fully hereinafter.

The invention consists substantially in the construction, combination, location, relative arrangement of parts and mode of operation, all as will be more fully hereinafter set forth as illustrated in the accompanying drawings, and finally pointed out in the appended claim.

Referring to the accompanying drawings:

Figure 1 is a side elevation of a pressed steel wheel, embodying my invention, parts being broken away, and parts in section.

Figure 2 is a transverse sectional view, taken on the line 2—2 of Figure 1.

Fig. 3 is a detached detail view of a form of split retainer ring employed to retain the wheel in place on the hub.

Fig. 4 is a detached detail broken view in section showing the retaining ring and hub cap in their relative assembled relation, and the ring receiving and expanding taper seat on the cap.

Fig. 5 is a similar view showing a form of tire rim suitable for employment in connection with a pressed steel wheel embodying my invention.

Fig. 6 is a similar view showing the application of the wheel spokes to the rim.

Fig. 7 is a view of a steel sheet which has been blanked out ready to be formed into a wheel in accordance with my invention.

Fig. 8 is a section on the line 8, 8, Fig. 1.

In carrying out my invention a steel sheet or plate of the required dimensions is stamped or blanked out into the form shown in Fig. 7, that is, the blank is formed with a central solid portion 10, the respective ends 11, 12, of which are tapered or inclined relative to the length of the body portion 10 of the blank. Each edge of the blank is kerfed or grooved, as shown at 13, to form spoke portions 14. Preferably the spoke portions 14 at one side of the central body portion 10 are out of line with those at the other side of said central body portion. I also prefer to so shape the kerfs or cutouts 13, as to leave the ends 15 of the spoke portions somewhat enlarged. In stamping out the blank I prefer also to press the spoke portions into transversely curved shape in cross section, as shown at 16, Fig. 8. This not only imparts increased strength to the wheel structure but also improves the appearance of the wheel. These are details, however, and of course I do not desire to be limited or restricted in the broader scope of my invention, to such details. The cutting or blanking operation is effected expeditiously and without difficulty in a suitable die press. When the sheet has been cut or blanked, as described, it is rolled into the form of a tube and the tapered or inclined edges 11, 12, are then secured together by welding or otherwise. The tube thus formed is then expanded in suitable shaping dies, or otherwise, at the end portions of the tubular part formed by the body 10 of the blank. It will be understood that the bore of this tube forms the opening at the center of the wheel, when completed, to receive the wheel carrying hub. In expanding the ends of the tube the inner end thereof, as indicated at 17, Fig. 2, is expanded to a greater extent than the outer end 18, thereby giving the bore or opening at the center of the wheel a longitudinal taper which materially facilitates the application of the wheel to and its removal from the hub, in assembling or demounting the wheel. I also prefer in some cases, to press the enlarged end 17 of the tube into polygonal shape, as indicated at 19, Fig. 1, to cooperate with a correspondingly shaped portion of the hub, thereby establishing in a most simple, economical and effective manner, a driving connection between the hub and wheel. If desired and in order to strengthen the wheel at this point, particularly in the case where the tire tread lies approximately in a vertical plane which also includes or intersects this driving connection, a reinforcing ring 20 may be applied to the bore of the portion 17 of the tube.

After blanking the sheet, rolling it into tubular form and expanding the ends of the tube, as above explained the spoke portions 14 are then bent outwardly so as to bring the free ends of the one set into line with those of the other set. In this relation the spoke ends are suitably secured together and to a tire rim of any desired type or structure. A very simple efficient and economical structure is shown wherein the tire rim is formed of complementary portions 21, 22, each having a tire engaging portion 23, along one edge, and an offset flange 24, along its other edge. In assembling the rim sections the flanges 24 are brought together with the enlarged end portions 15 of the spokes clamped therebetween. The rim flanges, with the spoke ends so clamped are then pressed and welded or otherwise secured together. In practice I prefer to notch out the opposed surfaces of the rim flanges 24, at the points where the spoke ends enter therebetween, as indicated at 25, Fig. 5, but not to a sufficient extent to permit the opposed surfaces of the flanges 24 to come into contact with each other when the spoke ends occupy the notched recesses 25. This enables me to secure a most expeditious effective and economical welding together of these parts under the influence of heat and pressure, and hence producing an exceedingly strong and durable, and at the same time inexpensive structure.

As above indicated, the pressed steel wheel constructed as described may be demountably applied in any desired way to any desired hub structure. As illustrative of a simple mounting for the wheel, I have shown a hub 26, mounted upon an axle 27, and having an inner portion 28 of large diameter exteriorly shaped to conform to and to receive the enlarged end 17 of the wheel bore, and preferably the exterior surface of the hub portion 28 is outwardly tapered to receive and form an efficient seat bearing for the correspondingly tapered portion 17 of the wheel bore so that the wheel may be efficiently clamped in seating engagement thereon when the cap screw, presently to be described, is turned up in assembling the wheel in place. The outer hub portion 29 is of smaller external diameter than the hub portion 28, and is exteriorly threaded to receive the interiorly threaded cap nut 30, by which the wheel is demountably secured upon the hub. The cap nut 30 is provided with an annular shoulder 32, and with an inwardly inclined or tapered annular surface 31, adjacent to the shoulder 32. A stamping 33 in the form of a split annulus or ring is seated upon the taper surface 31 of the cap nut and is formed with a flange portion 34 to receive and engage against the outer end of the wheel bore to clamp the wheel upon the hub. With this arrangement it will be readily seen that when the cap nut is turned up on the threaded portion 29 of the hub the retainer annulus or ring 33 is pressed against the wheel to force the latter firmly into its seating upon the hub, while at the same time the split retainer ring is expanded under the influence of the taper surface 31, and consequently exerts a gripping action upon the cap nut to prevent the latter from working loose or backing off in service.

If desired the usual brake wheel 35, may be secured to the wheel hub.

A pressed steel wheel produced and constructed as above described is not only strong and durable but is economical to manufacture and wheels of this structure may be expeditiously manufactured in large numbers.

Certain features disclosed but not claimed in this patent are claimed in Letters Patent, No. 1,371,382, issued March 15th, 1921, on a division of this application, and in my pending application, Serial No. 195,514, filed October 9th, 1917, for "Retaining devices for removable wheels" as a division of this application, and my pending application, Serial No. 492,767, for "Process of making pressed steel wheels", filed August 16th, 1921, as a division of this application.

Having now set forth the objects and nature of my invention and a construction and mode of procedure embodying the same, what I claim as new and useful and of my own invention, and desire to secure by Letters Patent is:

In a wheel, the combination of an inner hub having a central seating portion of polygonal cross-section, a central tubular member having its inner end enlarged and of polygonal cross-section to co-operate with the seating portion of said inner hub, a plurality of flat spokes formed integral with and extending from the ends of said tubular member, and a rim connected to the ends of said spokes, the ends of said spokes lying in the central plane of the wheel tread and the spokes extending from the outer end of said tubular member making a greater angle with the said plane than the spokes extending from the inner end of said member.

In testimony whereof I have hereunto set my hand in the presence of the subscribing witnesses, on this 15th day of February, A. D. 1917.

JOSEPH LEDWINKA.

Witnesses:
J. MARMION,
A. H. BUXBAUM.